Patented Apr. 9, 1935

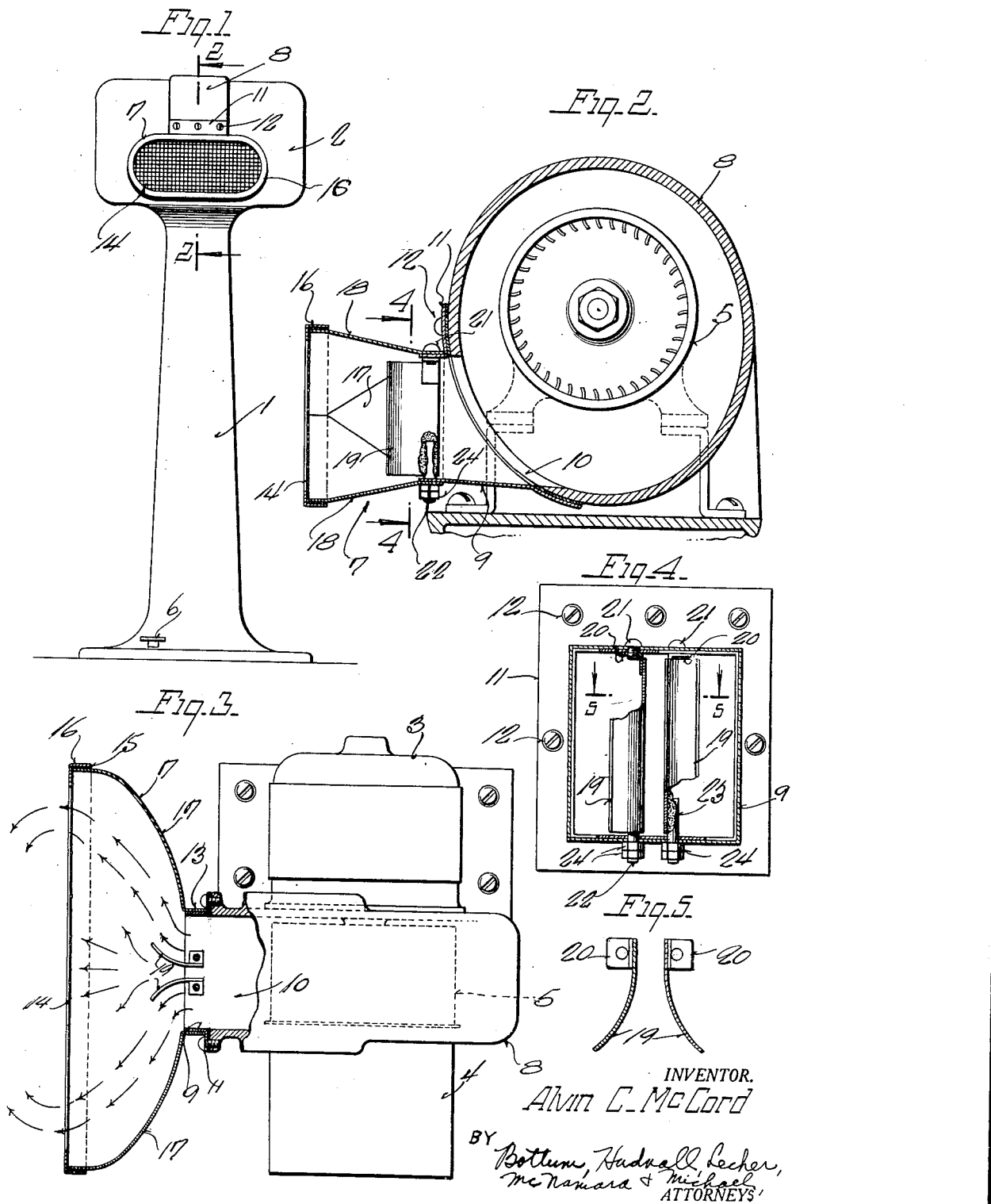

1,997,387

UNITED STATES PATENT OFFICE 1,997,387

NOZZLE FOR HAND DRIERS

Alvin C. McCord, Chicago, Ill., assignor, by mesne assignments, to McCord Radiator & Mfg. Co., Detroit, Mich., a corporation of Maine Application July 3, 1931, Serial No. 548,535

1 Claim. (Cl. 34—26)

This invention relates to electrically operated hand and like driers, such as are used in wash rooms of hotels, factories, clubs, railway stations and the like.

The invention has particular reference to the nozzle structure of the drier, whereby the heated air discharged from the device will be so spread and deflected as to encompass all portions of the hands held in front of the nozzle during the use of the drier and thus insure drying of the backs as well as the palms of the hands.

In carrying out the objects of the invention, the nozzle is flared outwardly so that the heated air discharged into the nozzle by the blower in the operation of the drier may be spread over a relatively wide area, deflector means being incorporated in the nozzle to insure the desired spreading of the heated air toward and against the flared walls of the nozzle.

A further object of the invention is to adjustably mount the deflector means in the nozzle so that the deflector means may be set in the adjusted position required to insure the desired spreading of the heated air from the nozzle.

The invention consists further in the matters hereinafter described and claimed.

In the accompanying drawing—

Fig. 1 is a front elevational view of an electrically operated hand drier equipped with a nozzle constructed in accordance with my invention;

Fig. 2 is an enlarged vertical sectional view taken on line 2—2 of Fig. 1.

Fig. 3 is a top plan view of the structure shown in Fig. 2 with parts in section;

Fig. 4 is a vertical sectional view taken through the nozzle on line 4—4 of Fig. 2; and Fig. 5 is a horizontal sectional view taken through the deflector means on line 5—5 of Fig. 4.

In Fig. 1, the invention is shown as applied to an electrically operated drier of the pedestal type, although the invention may be applied to the wall and other types of driers.

In the pedestal type, the drier has an upright supporting pedestal 1 which sets on the floor of the room or compartment in which the drier is used. A casing 2 is provided at the upper end of the pedestal and serves as a housing for the operative parts of the apparatus. These parts include an electric motor 3 at one end of the housing, and an electric air heating element 4 at the opposite end of the housing, through which element the air to be heated is drawn from the outside of the housing by a fan or blower 5 located between the motor 3 and heating element 4, as shown in Fig. 3.

The fan or blower 5 is mounted on the armature shaft of the motor, the latter in the type of apparatus shown in the drawing being arranged with its armature shaft horizontal. The switch for the motor 3 is controlled by a depressible foot pedal 6 at the base of the pedestal. When the motor is set in motion, the blower 5 is rapidly rotated to draw air through the heating element 4 and discharge the heated air out of the nozzle 7. The blower 5 is located in a casing 8 arranged in the housing 2 between the motor 3 and heating element 4, which casing 8 is rotatably mounted to be manually turned about the axis of the blower for adjusting the elevation of the nozzle 7. This is accomplished by having the nozzle secured to the casing 8.

As shown in Fig. 3, the nozzle 7 is secured to the blower case 8 by a fixture having a spout section 9 extending outward from and surrounding the discharge opening 10 of the blower casing. The spout section 9 has a face plate 11 by which the spout section is secured to the outer curved surface of the casing 8, screws 12, 12 being used for this purpose, as shown in Figs. 2 and 4. The spout section 9 is preferably rectangular in shape, as best shown in Fig. 4, and provides means whereby a similarly shaped tubular or flanged section 13 on the rear side of the nozzle 7 may be slipped over the spout section and be secured thereto. A suitable gasket may be clamped between the face plate 11 and the blower case 8.

The nozzle 7 is preferably made in flared form and is covered at its outer or discharge end with a wire mesh or other protective screen 14, as shown in Figs. 1 and 3. The screen 14 is preferably bent at its margin, as at 15, to fit over the outer side of the nozzle 7 about its discharge opening and is secured in place by a flanged finishing strip or band 16, as shown in Figs. 2 and 3. The nozzle 7 is also elongated and is arranged with its longest dimension horizontal or substantially parallel to the axis of rotation of the blower as shown in Fig. 1. The side walls 17, 17 of the nozzle are curved outwardly so as to provide for the spreading of the heated air over a relatively large area. The top and bottom walls 18, 18 of the nozzle are preferably flat, although they are outwardly inclined so as to diverge and thus aid in spreading the heated air. The nozzle 7 and its attaching member 9—13 are in effect one fixture in which the hereinafter mentioned deflector means is located.

The deflector means in the nozzle comprises a pair of vertically disposed plates 19, 19. The plates are located in the nozzle at a point adjacent the discharge opening 10 of the blower casing 8 and are preferably mounted within the spout section 9, as shown in Fig. 3. The plates 19 extend from the top to bottom of this fixture, as shown in Fig. 4, and are pivotally secured to the fixture so that the plates may be adjusted toward and from each other to the extent of divergence necessary to secure the proper deflection of the heated air passing through the nozzle. The plates 19 are curved transversely and are arranged with their concave sides facing the side walls 17 of the nozzle. By adjusting the plates, these concave sides may be so set with respect to the side walls of the nozzle that the air currents deflected by the concave sides of the plates will be directed against the adjacent walls of the nozzle as to cause such currents on leaving the nozzle to be returned toward the axial center of the nozzle and thus reach the backs of the hands held in front of the nozzle during the operation of the device, as indicated by the arrows in Fig. 3. The convex sides of the plates 19 face each other and with the plates spaced apart, a passage is provided for the flow of air directly out of the nozzle along its axial line to furnish heated air for the palms of the hands.

The plates 19 are provided at their inner ends at the top with laterally extended ears 20, 20 to receive screws 21, for securing the upper ends of the plates to the spout section 9. Studs 22 are provided at the lower ends of the plates to provide adjusting axis members therefor. The studs are rigidly attached to the plates 19, as by means of solder 23. The studs 22 extend through the bottom wall of the spout section 9 and are threaded to receive nuts 24 by means of which the plates are fastened in their positions of adjustment.

The deflector means of my invention is particularly well adapted to a nozzle structure for an apparatus of the character described, and permits deflection of the air currents from the nozzle in such manner as to reach the backs of the hands of the person using the machine, without the expense of any complicated mechanism for that purpose. The deflector plates are simple in construction, are easily and readily mounted in place, are easily set or adjusted to the extent desired and accomplish the result set forth effectively.

The details of the structure shown and described, may be changed and modified without departure from the spirit and scope of my invention.

I claim as my invention:

In an electrically operated hand or like drier, a blower having a discharge opening, a heating element for heating the air discharged from the blower, a nozzle secured to the blower at the discharge opening and flared outwardly therefrom to provide a discharge orifice at the outer end of the nozzle of a sufficiently large area to encompass the hands held in front of the nozzle, said nozzle being substantially oval-like in form and arranged with its major axis substantially parallel to the axis of rotation of the blower and having curved walls at the ends of the oval, and transversely curved deflector plates within the nozzle adjacent the discharge opening, said plates extending across the major axis of the nozzle and spaced apart to provide for the flow of air directly out of the nozzle along its axial line to furnish heated air for the palms of the hands held in front of the nozzle, said plates being arranged with their concave sides toward the curved walls of the nozzle whereby the air striking the plates will be deflected toward said curved walls to cause such air on leaving the nozzle to be returned toward the axial center thereof for reaching the backs of the hands held in front of the nozzle.

ALVIN C. McCORD.